United States Patent [19]

Judd

[11] Patent Number: 5,054,406
[45] Date of Patent: Oct. 8, 1991

[54] WATER RETARDANT COVERING MATERIAL FOR SOLID WASTE LANDFILLS

[75] Inventor: Wendell Judd, Fairfield, Ohio

[73] Assignee: Technology Development Corporation, Columbus, Ohio

[21] Appl. No.: 551,186

[22] Filed: Jul. 11, 1990

Related U.S. Application Data

[63] Continuation-in-part of Ser. No. 471,971, Oct. 27, 1989, Pat. No. 5,018,459.

[51] Int. Cl.$^5$ ................................................ F23G 5/02
[52] U.S. Cl. ................................... 110/346; 110/224; 110/246; 405/129
[58] Field of Search ............... 405/129; 110/341, 346, 110/246, 224

[56] References Cited

U.S. PATENT DOCUMENTS 4,753,551 6/1988 Brueggemann et al. ....... 405/129 X
4,908,129 3/1990 Finsterwalder et al. ....... 405/129 X Primary Examiner—Edward G. Favors
Attorney, Agent, or Firm—George Wolken, Jr.

[57] ABSTRACT

The present invention describes a water retardant material produced by a mixture of earthen clay and 15% to 25% by weight of recycled paper pulp sludge. Paper pulp sludge is incinerated in a rotary kiln, typically a rotary cement kiln asphalt dryer, or fluidized bed incinerator. Paper pulp sludge is fed continuously into said rotary kiln while temperature are maintained in the range of approximately 800° to 3500° F. During incineration, mixing catalysts (typically casein or soy protein) and wood pulp fibers are burned while moisture is evaporated. The resulting incinerated product consists essentially of carbonate particles which are collected for subsequent use. Use of this material as a water retardant covering for landfills is described.

9 Claims, 2 Drawing Sheets

WATER RETARDANT COVERING MATERIAL FOR SOLID WASTE LANDFILLS

BACKGROUND OF INVENTION

This application is a continuation-in-part of application Ser. No. 07/471,971, filed on Oct. 27, 1989, U.S. Pat. No. 5,018,459.

This invention relates to the general field of solid waste disposal in landfills, and more particularly, this invention relates to a water retardant material for use as a landfill cover, reducing the water-induced leaching of landfill material, and prolonging the period until landfill repair is required.

The disposal of solid waste in an evironmentally satisfactory manner is a vital concern in modern society. The burial of solid wastes in landfills is a common method of disposal and is likely to remain so for a very long period into the future. Therefore, the sound management of landfills is an important concern to which the present invention is addressed.

The typical operation of landfills involves filling the landfill with the appropriate volume of waste material until the legal limits are obtained. At this point, the landfill operation must be terminated, the landfill covered and returned to use in as environmentally satisfactory manner as possible. Typically, the waste material will be compacted to the extent feasible. The waste material will be covered by earth, gravel, clay or similar materials. Typically, a layer of topsoil will be placed uppermost on the closed landfill for purposes of growing grass or other vegetation.

However, in the course of a few years, normal amounts of rainwater will seep through the upper layers of landfill cover and find its way into the disposed, buried wastes. In the course of time, such water will leach various materials out of the buried wastes. Two undesirable effects follow. Firstly, the material leached from the waste will frequently carry undesirable chemicals into the ground water supply of the surrounding environment. Secondly, as material is leached from the buried waste, such buried waste loses density. Typically, voids will develop in such buried wastes, ultimately leading to collapse of the upper surface. This typical collapse of landfills seriously reduces the surface uses which can be made of such closed landfills. It is common to have to again cover the landfill, fill in collapsed regions, and once again render the surface layer fit for other uses.

This problem of leaching from closed landfills is sufficiently serious that water retardant covers have been employed. The purpose of a cover for landfills which repels water will be to reduce the rate of leaching material from the buried wastes. Thus, less material will be added each year to the ground water, placing less demands on natural or man-made purification mechanisms. Also, a longer useful life for the surface can be expected before repair is required, reducing the life-cycle costs of landfill operations.

The present invention is a water retardant material suitable for use as a cover for landfills. This water retardant material is produced from a mixture of earthen clay and a waste material produced as a by-product in the manufacture of paper.

The manufacture of paper, cardboard and related products typically results in large quantities of waste material known as "sludge". This sludge contains large amounts of water, wood fibers, calcium carbonate, other minerals and clays, various mixing catalysts (typically soy protein or casein), and chlorine-based purifying agents used in the paper making process. There is no precise composition for this sludge because there are substantial variations in the wood and other feedstocks used; in the processing materials which must be used to make different types of paper products; and even considerable variation in the processes used by different paper makers in making similar products.

The disposal of this waste sludge is a continuing problem for the paper manufacturers and for the environment in general. Current practice is to subject the sludge to a mechanical pressing operation to remove excess moisture. The resulting residue still holds large quantities of water, as well as the other materials listed above. Under current procedures, this residue is then typically deposited into a landfill for indefinite storage.

There are several problems associated with this treatment of paper pulp sludge. First of all, it is getting increasingly difficult to locate suitable landfills as existing landfills become full and residents typically oppose expansion or creation of new landfills near residences. In addition, the materials which leach from sludge deposited into landfills is hazardous itself. This increases the cost of engineering a suitable disposal site (due to the increased costs of handling such leachates), and increases community and environmental concerns.

The present invention proposes an alternative treatment and useful function for this paper pulp sludge. The present invention demonstrates how paper pulp sludge can be processed into a commercial product similar to re-calcified calcium carbonate. (Due to the variation in composition of the sludge noted above, the processed sludge from the present invention has varying compositions.) This processed sludge has many of the useful properties of calcium carbonate. As shown below, when mixed with earthen clay, this waste material produces a usable water retardant material, suitable for use as a landfill covering or in other water retardant applications.

Thus, the present invention offers the possibility of creating economic benefit from an otherwise difficult and environmentally detrimental, disposal problem.

SUMMARY AND OBJECTS OF INVENTION

This invention relates to a novel use for recycled paper pulp sludge, in combination with earthen clay, to produce a water retardant material. A particular use for such material is a water retardant covering layer for landfills.

A primary object of this invention is to produce a water retardant material from paper pulp sludge.

Another object of this invention is to provide a water retardant cover for landfill.

Yet another object of this invention is to prolong the useful life of the land above closed landfills by reducing the rate of leaching and collapse of surface land.

Another object of this invention is to reduce the rate of chemical leaching into the ground water in the vicinity of landfills.

DESCRIPTION OF PREFERRED EMBODIMENTS

Figure 1:
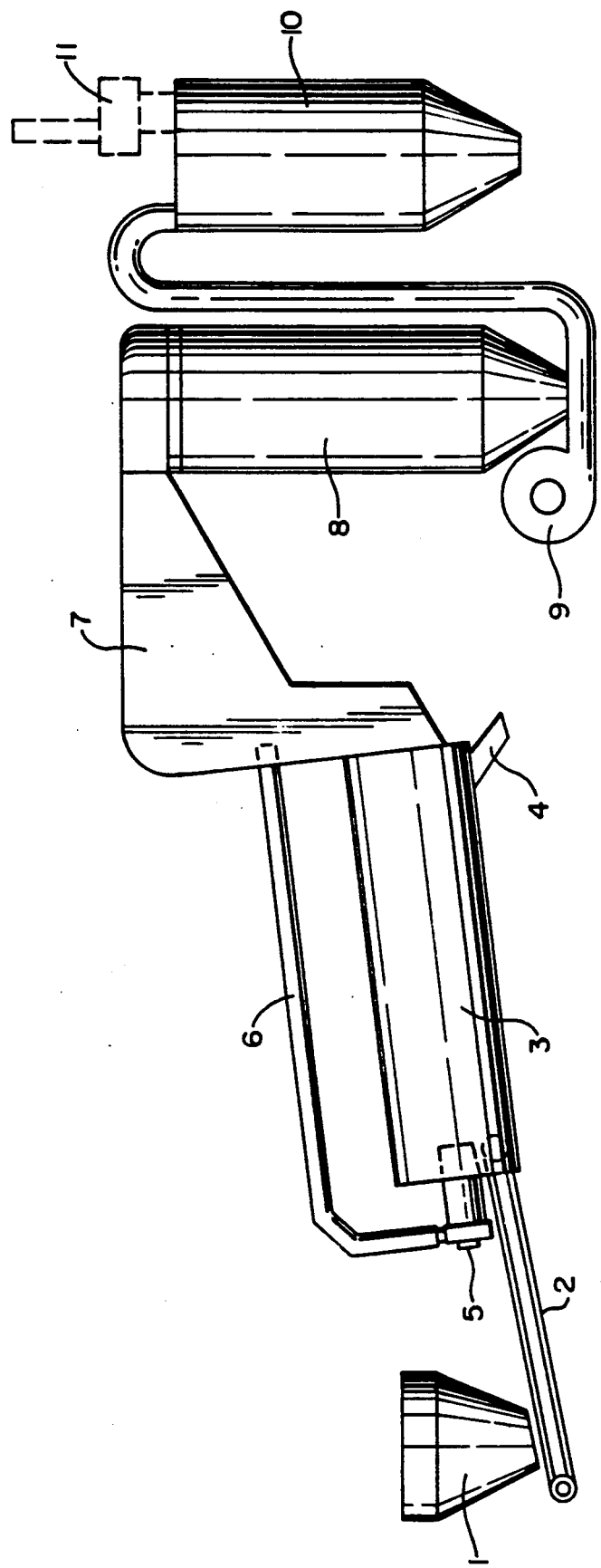
FIG. 1: A perspective view of a typical apparatus in which incineration of paper pulp sludge is performed.

This invention relates to recycled paper pulp sludge produced in accordance with the methods described below. In particular, this invention relates how such recycled material can be used to produce a water retardant solid and how such solid is useful as a landfill cover. Particularly this invention relates to the use of recycled paper pulp sludge, in combination with earthen clay materials, to provide a water retarding cover for landfills being covered and removed from service. It is described how such material retards water leaching of material from such landfills, prolonging its life and reducing the rate of leaching various chemicals from such landfills into nearby ground water.

In a typical embodiment of the present invention, paper pulp sludge is fed from a sludge holding bin (1) by means of a slinger conveyer (2) into a heater (3). In typical operation, the feeding operation from bin (1) would be done in a continuous manner, with replenishment of the contents of bin (1) from paper-making operations. Typically, the heater (3) would be a rotary kiln fired by gas or oil, typically by means of a burner (5) producing approximately 80 million BTU. Typical kilns such as an asphalt dryer, rotary cement kiln or fluidized bed incinerator can be successfully employed. The temperature inside heater (3), in the region in which incineration of the paper pulp sludge occurs, is typically maintained in excess of approximately 800° Fahrenheit up to a maximum of approximately 3500° Fahrenheit; the maxium temperature depending primarily on the maximum heating capabilities of the burner (5) and heater (3). These temperatures are sufficient to incinerate the undesirable chemical impurities present in typical paper pulp sludge, including such components as wood fibers, chlorine purifying agents, mixing agents and others. Simultaneously, vestiges of water remaining are also evaporated essentially completely. Temperatures in the higher ranges, above approximately 2400° Fahrenheit will be used to destroy hazardous materials, typically dioxins, which are typically formed in the incineration process.

The incineration products are removed from the heater, typically through product chute (4) at the end of the firing process. Typically, the product will require 10 to 12 minutes to pass through rotary heater (3) and emerge through chute (4) adequately incinerated. The minimum time of transit through the heater (3) will vary with exact product composition, mass, and temperature. However, there are typically no serious problems caused by over-heating of the product in the heater, so it is not difficult in practice to achieve an adequate process for typical paper pulp sludges.

A drop-out chamber (7) contiguous with the heater is typically used for product collection. A smoke return (6) continuously captures smoke generated in the typical operation of the present incineration process to avoid release to the environment. The smoke is typically recycled back into the heater (3).

A bag-house (8) is typically used to filter residual fine dust particles ("fines") from the product and direct these fines by means of blower (9) into a fines collection bin (10). In typical operations, the bag-house (8), and fines collector (10) are used to prevent particles from being released into the atmosphere, in compliance with typical environmental regulations and good operating procedure.

FIG.1 shows the paper pulp sludge entering the heater, 3, from the lower end, being transported through heater 3 to emerge at the upper end. An alternative procedure, typically used for asphalt dryers, cement kilns, and other furnaces, would have the material entering the heater from the elevated end, receiving processing in its downhill passage to emerge from the lower end of the heater. An uphill traverse, as shown in FIG. 1, would require the use of spiral transport vanes or another well-known and obvious means for transporting the material through the heater. A downhill traverse would typically not require extra transporting mechanisms, depending on gravity and the rotary action of the heater to move the material from the entrance to the exit of said heater. Both types of heater, uphill or downhill traverse, can be used to practice the present invention with no significant difference in the results, since both types of heaters can provide comparable temperatures and transit times for processing sludge in accordance with the present invention.

In some operations, it may be prudent to mount an auxiliary burner (11) on the exit stack from the process to incinerate finally and completely the materials resulting from the present processing. We anticipate that this final burner will not be required in all cases, but is expected to be useful in some processes.

There is typically a wide variation in the composition of paper pulp sludge due the variations in feedstock materials, variations in processing used to make various kinds of papers, and variations in the processes used by different manufacturers. Therefore, the processing temperatures and times are also subject to variations, but sufficient conditions are easily determined by simple tests on pilot runs. The parameters and conditions here are typical conditions found to be sufficient for a wide range of processing needs for paper pulp sludges. Obvious modifications to this process will be apparent to those skilled in the art to meet special cases occurring for a particular paper pulp sludge.

Paper pulp sludge produced in accordance with the above process is mixed with conventional earthen clay in a proportion of approximately 15% to 25% by weight recycled paper pulp sludge. The resulting material is a clay-like substance which can be spread by suitable earth-moving equipment. Laboratory test demonstrate that the addition of recycled paper pulp sludge drastically increases the water retardant properties of normal earthen clay. Typically, drops of water placed onto 100% earthen clay will be absorbed by said clay at once. When 15% to 25% by weight of recycled paper pulp sludge is mixed with the same earthen clay, drops of water placed on such material will remain in droplet form, substanially unabsorbed, for typically a period of minutes. Thus, such material is not expected to be fully impervious to penetration by water. It is expected, however, that the water retardant properties of such material, when mounded in sufficient depth over a landfill, will be effective in directing water away from the waste material in such landfill. It is not expected that 100% dryness will be obtained in practice with this covering. However, it is expected that substantial amounts of water which would otherwise cause leaching of the underlying waste material, will be directed away from such wastes. Thus, environmentally improved operation of landfills will result, particularly in the years following closing such landfills.

Figure 2:
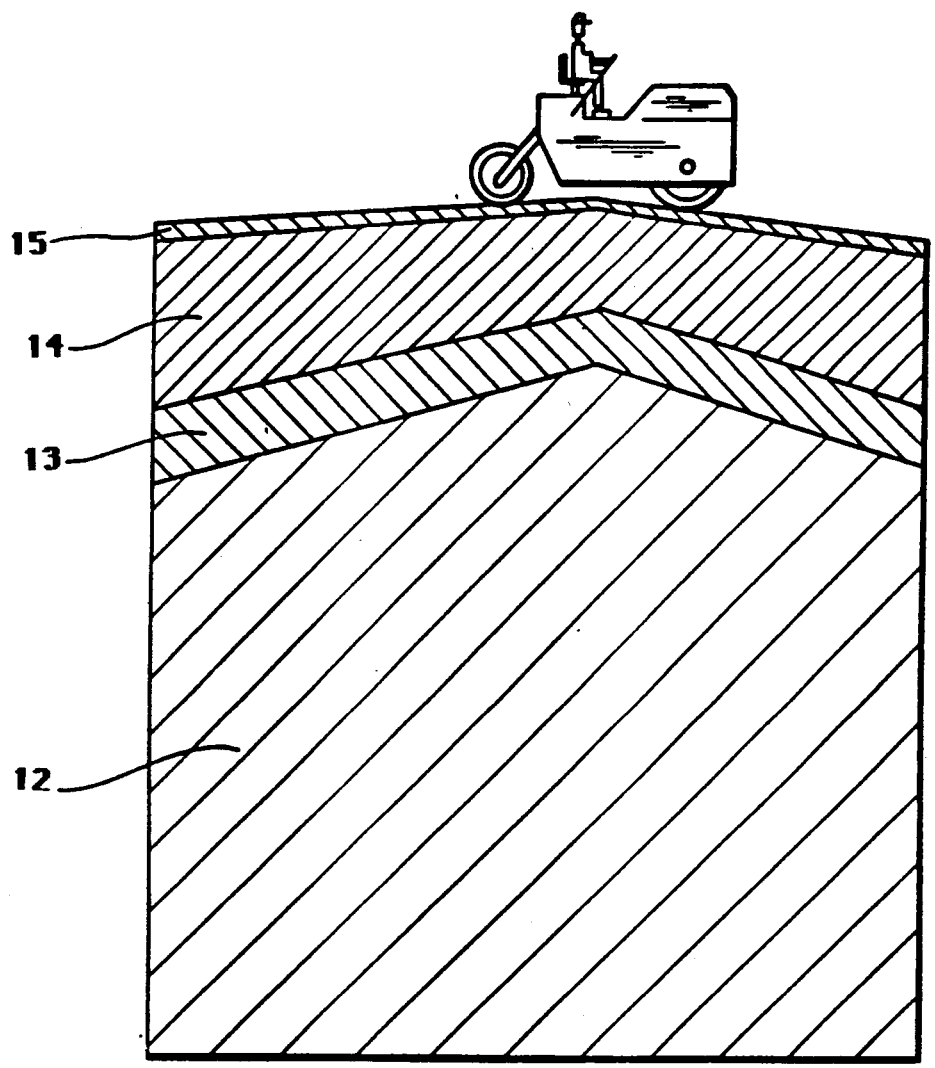
FIG. 2: Cut-away, cross sectional view of a typical solid waste disposal landfill following closing and covering of said landfill. Thickness of various layers shown in this figure are not in proportion.

FIG. 2 shows in cross-section a cut-away view of a typical landfill as it would be covered following maximum disposal of wastes. The maximum permissable amount of wastes, typically compacted by rolling, is typically deposited into a landfill as 12. After the present invention, a material consisting of 15% to 25% by weight of recycled paper pulp sludge is prepared, typically by mixing in conventional earth or concrete mixing equipment. The resulting material would be deposited in a layer, 13, directly above the waste material, of the landfill. Typically, the water retardant cover would be deposited in a cone shaped layer, directing the water in umbrella-fashion towards the edges of such landfills. Typically, depths of 12 inches to 24 inches of water retardant cover, 13, would be employed.

Above the water retardant covering of the present invention, 13, would typically be placed a layer, 14, of gravel, earth, or other typical materials used for covering landfills. This layer, 14, would typically be covered by a relatively thin layer, 15, of topsoil or other material suitable to support grass or other vegetation. The surface of such landfill would typically then be turned to other uses.

I claim:

1. A water retardant material comprising a mixture of earthen clay and from 15% to 25% by weight of recycled paper pulp sludge produced according to the following process;
   a) introducing paper pulp sludge into a heater wherein said heater maintains a temperature of at least 800° Fahrenheit,
   b) rotating said heater containing said paper pulp sludge while maintaining said temperature of a least 800° Fahrenheit until essentially all water contained in said paper pulp sludge is removed by evaporation and further, until essentially all wood fibers and mixing catalysts contained in said paper pulp sludge are incinerated, resulting in a substantially dry incineration product,
   c) extracting said incineration product from said heater.

2. A water retardant material as in claim 1 wherein said process for producing recycled paper pulp sludge further comprises the steps of introducing paper pulp sludge continuously into a first end of a continuously rotating heater, and extracting said recycled paper pulp sludge from the opposite end of said rotating heater.

3. A water retardant material as in claim 2 wherein said continuously rotating heater maintains a temperature of at least 2,400° Fahrenheit for sufficient time to destroy essentially all dioxin products formed by said heating of said paper pulp sludge.

4. A method for producing a water retardant covering layer for landfills using the material of claim 1, comprising the steps of spreading said material in a layer above the waste material of said landfill in a substantially conical shape in such configuration as to direct water incident from above on said layer away from said waste material.

5. A method for producing a water retardant covering layer for landfills using the material of claim 2, comprising the steps of spreading said material in a layer above the waste material of said landfill in a substantially conical shape in such configuration as to direct water incident from above on said layer away from said waste material.

6. A method for producing a water retardant covering layer for landfills using the material of claim 3, comprising the steps of spreading said material in a layer above the waste material of said landfill in a substantially conical shape in such configuration as to direct water incident from above on said layer away from said waste material.

7. A method as in claim 4 wherein said layer has a thickness of at least 12 inches.

8. A method as in claim 5 wherein said layer has a thickness of at least 12 inches.

9. A method as in claim 6 wherein said layer has a thickness of at least 12 inches.

* * * * *